I. WOODCOCK.
Carriage.

No. 5,514.

Patented Apr 18, 1848.

UNITED STATES PATENT OFFICE.

ISAAC WOODCOCK, OF WORCESTER, MASSACHUSETTS.

HANGING BODIES OF TWO-WHEELED CARRIAGES.

Specification of Letters Patent No. 5,514, dated April 18, 1848.

*To all whom it may concern:*

Be it known that I, ISAAC WOODCOCK, of Worcester, in the county of Worcester and State of Massachusetts, have invented a new and Improved Two-Wheeled Vehicle, which I denominate a "Woosteree"; and I do hereby declare the following to be a full, clear, and exact description thereof, reference being had to the accompanying drawings, making a part of this specification, in which—

Figure 1:
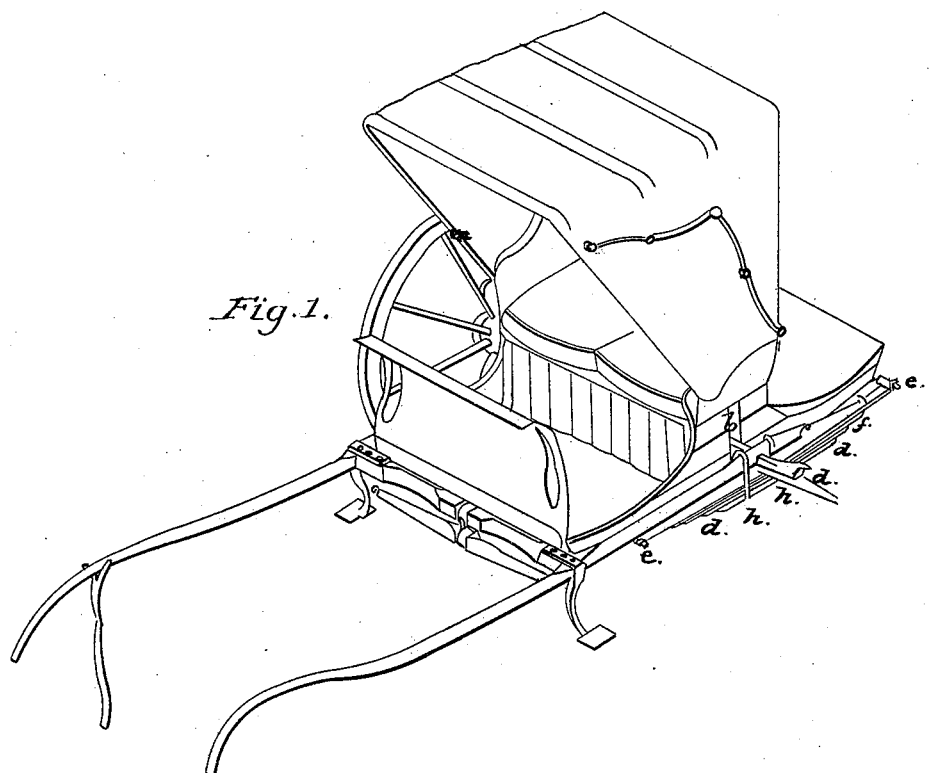
Figure 1:
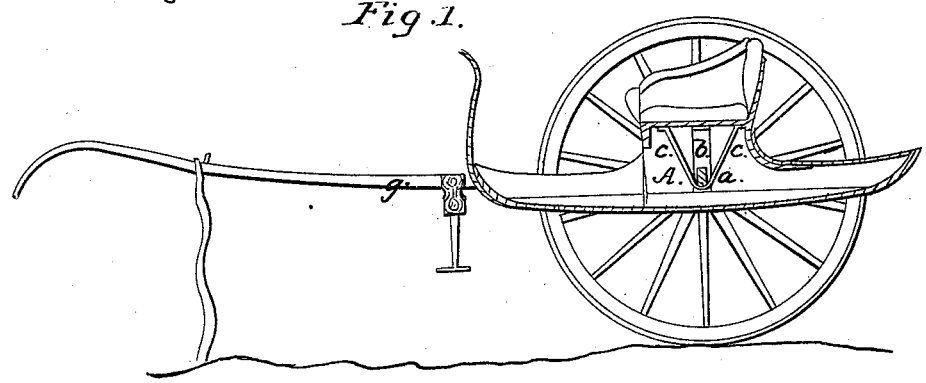

Figure 1 is a perspective view, and Fig. 2 a vertical longitudinal section of the same.

The nature of my invention consists in the compact combination of a chaise or buggy body, with an axle and a pair of shafts, in such a manner that the entire weight of the body and its load will be suspended to the axle; (not resting upon and fatiguing the horse;) and in such a manner that the motion of the body of the vehicle is kept perfectly steady and prevented from any violent jerks or vibrations, however rough the road may be.

Similar letters refer to corresponding parts in both the figures.

A, is the body of the vehicle; $a$, is the axle; $g, g$, are the shafts; $d, d$, are the semi-elliptic, or bow springs, by which the body of the vehicle is suspended to the axle; $b, b$, are vertical slots formed in each side of the body of the vehicle, through which the axle $a$, passes under the seat of the same. Arms project from near each corner of the body of the vehicle, which are connected to the ends of the springs $d, d$; the slots $b, b$, in the sides of the vehicle, allow a free vertical movement of the body of the vehicle on its springs.

$c$, is a strap passing under the axle, the ends of which are made fast to the under side of the seat of the vehicle; the object of which is to prevent too great a rebound of the same.

$f$, is a steadying guard, secured to the central and rear portion of each of the springs $d$, for the purpose of preventing the rebound of the after portion of the same when the vehicle strikes against an obstruction.

The shafts $g, g$, the steadying guards $f, f$, and the springs $d, d$, are secured to the axle $a$, as follows: The shafts $g, g$, are halved to the upper side of the axle,—their rear ends extending a short distance to the rear of the same; the steadying guards $f, f$, are halved to the under side of the axle, so as to bring the upper side of the steadying guards in contact with the under sides of the shafts; the springs $d, d$, are then placed under the steadying guards, with their centers under the axles; the whole are then secured to each other and to the axle, by the cliff bolts $h, h$, placed in front and rear of the axle, embracing the shafts, steadying guards, and springs. It will be perceived that the front end of the steadying guards extend about the same distance in front of the axle, that the rear ends of the shafts do to the rear of the same; which arrangement gives the requisite degree of stiffness to the guards. The steadying guards serve to give a steady motion to the body of the vehicle, and also serve to guard the springs from injury, by preventing the upward rebound of the rear end of the springs that would take place when the wheels strike against an obstruction that would throw the body of the vehicle forward were the steadying guards not placed over the springs. Without these steadying guards, I find it almost impossible to ride over rough roads in my Woosteree, the vibration is so great; but with the guards, there are no sudden jerks, or unpleasant vibrations; and every one who has rode in it, pronounces it the easiest and pleasantest moving vehicle they have ever been in.

Having thus fully described my improved two wheeled vehicle, or Woosteree, what I claim therein as new and desire to secure by Letters Patent is—

The combination of the steadying guards with the springs substantially in the manner and for the purpose herein set forth.

ISAAC WOODCOCK.

Witnesses:
   Z. C. ROBBINS,
   GUY C. HUMPHRIES.